United States Patent [19]

Hackelman et al.

[11] Patent Number: 4,918,629
[45] Date of Patent: Apr. 17, 1990

[54] ENGINE TRIM TACHOMETER UNIT AND CALIBRATION METHOD

[75] Inventors: Kris L. Hackelman, Mukilteo; Alfons R. Kontvis, Alderwood Manor, both of Wash.

[73] Assignee: The Boeing Company, Seattle, Wash.

[21] Appl. No.: 178,718

[22] Filed: Apr. 7, 1988

[51] Int. Cl.[4] .............................. G06F 15/20
[52] U.S. Cl. .............................. 364/565; 364/431.02; 364/550
[58] Field of Search .......................... 60/39.281, 243; 364/434, 440, 431.01, 431.02, 431.03, 463, 550, 551.01, 565; 73/112, 117.4; 324/73 R, 158 SY

[56] References Cited

U.S. PATENT DOCUMENTS

| | | | |
|---|---|---|---|
| 3,040,983 | 6/1962 | Bigelow | 364/703 |
| 3,750,465 | 8/1973 | Howell et al. | 364/431.02 |
| 4,032,757 | 6/1977 | Eccles | 364/431.02 |
| 4,110,605 | 8/1978 | Miller | 364/463 |
| 4,158,884 | 6/1979 | McKinley et al. | 364/431.02 |
| 4,159,625 | 7/1979 | Kerr | 60/243 |
| 4,468,924 | 9/1984 | Moore | 60/39.281 |
| 4,536,843 | 8/1985 | Lambregts | 364/434 |
| 4,551,972 | 11/1985 | Lewis | 60/39.281 |
| 4,651,563 | 3/1987 | Zweifel | 364/431.02 |
| 4,787,053 | 11/1988 | Moore | 364/551.01 |

Primary Examiner—Kevin J. Teska
Attorney, Agent, or Firm—Conrad O. Gardner; B. A. Donahue

[57] ABSTRACT

An engine trim tachometer capable of use with a variety of aircraft engines. More particularly, the present tachometer unit is characterized by a plurality of separately operating engine speed parameter measuring channels, an engine variety selection switch individually associated with each channel and interlockingly arranged for common movement whereby each channel remains associated with one engine variety, a plurality of operator selective interface connectors for establishing the necessary electronics required by each individual engine variety, and a clock driven programmable divider for establishing the division ratio for each channel associated display meter.

1 Claim, 13 Drawing Sheets 4,918,629

ENGINE TRIM TACHOMETER UNIT AND CALIBRATION METHOD

BACKGROUND OF THE INVENTION

The present invention relates to engine trim tachometer units for measuring engine percent RPM of aircraft engines, and more particularly, to an engine trim tachometer unit for measuring and displaying N1, N2, and N3 simultaneously.

SUMMARY OF THE INVENTION

Heretofore, flight line equipment would read the percent RPM, but such equipment was designed to read only one engine type in contrast to a preferred embodiment of the present invention.

Prior art background literature relating to fan speed, trim, and N1 speeds is exemplified and discussed in e.g. U.S. Pat. Nos. 4,551,972; 4,536,843; 4,159,625; and 4,110,605.

U.S. Pat. No. 3,040,983 which reads and displays readings of pulse-trains, is primarily concerned with the display of the frequency ratio between two input pulse-trains and may be contrasted to the present engine trim tachometer unit and calibration method which utilizes a ratio process in treating individual pulse-trains from the engine spools and does not calculate a ratio of one pulse train to another.

It is accordingly an object of the present invention to provide an engine trim tachometer unit and calibration method for reading percent engine fan speed for N1, N2 or N3 where the frequency input for N1, N2, and N3 are different for different engines.

BRIEF DESCRIPTION OF THE DRAWINGS

The present invention may be better understood and its numerous advantages will become apparent to those skilled in the art by reference to the accompanying drawings wherein like reference numerals apply to like elements in the various figures and in which:

FIGS. 3A, 3B, 3C, 3D, 4A, 4B, 4C, 4D, 5A, 5B, 5C, and 5D show a complete schematic diagram of the engine trim tachometer unit.

DESCRIPTION OF THE PREFERRED EMBODIMENTS

Figure 1:
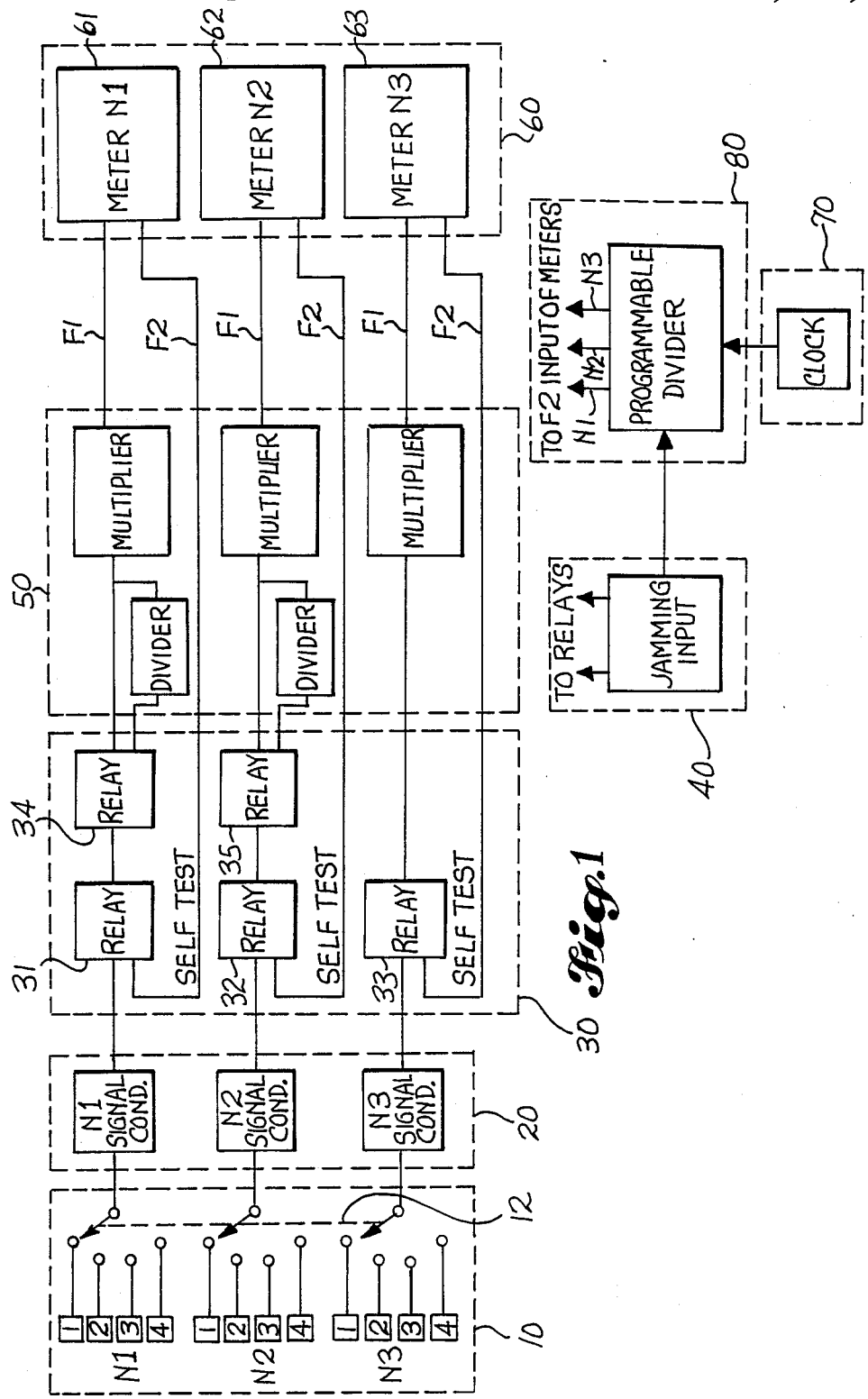
FIG. 1 is a block diagram of the present engine trim tachometer unit.
Figure 2:
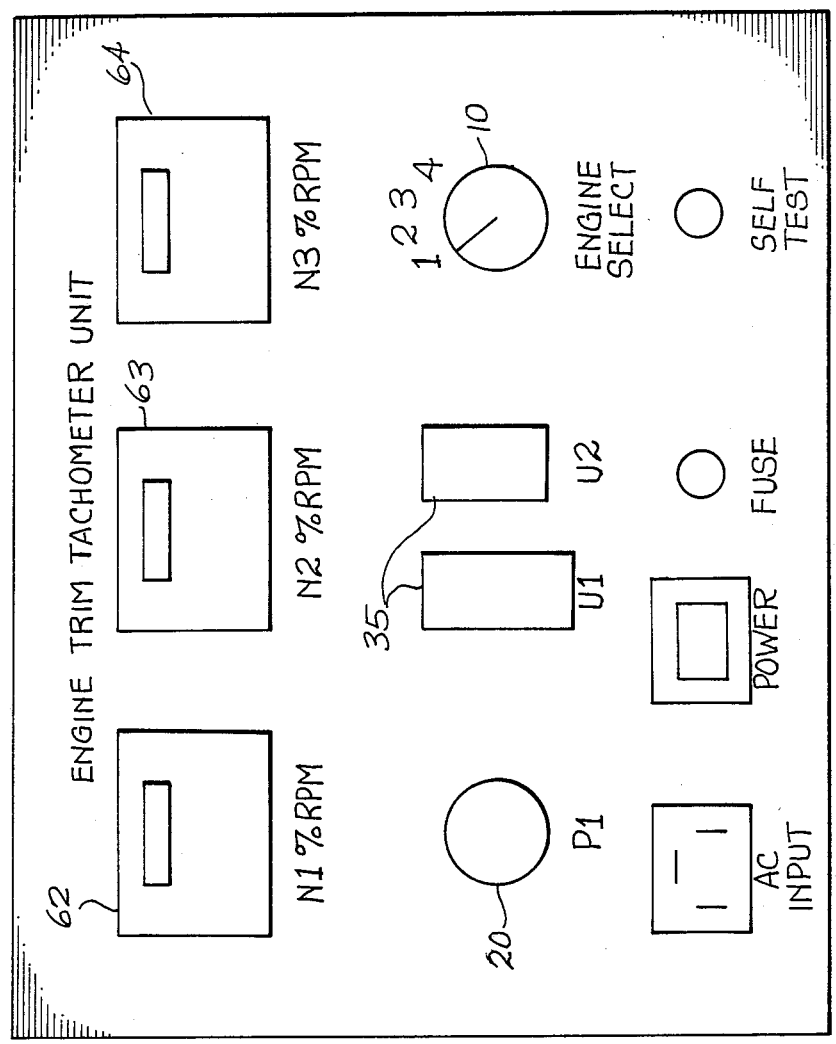
FIG. 2 is a front panel layout of controls for the operator of the present engine trim tachometer unit.
Figure 3A:
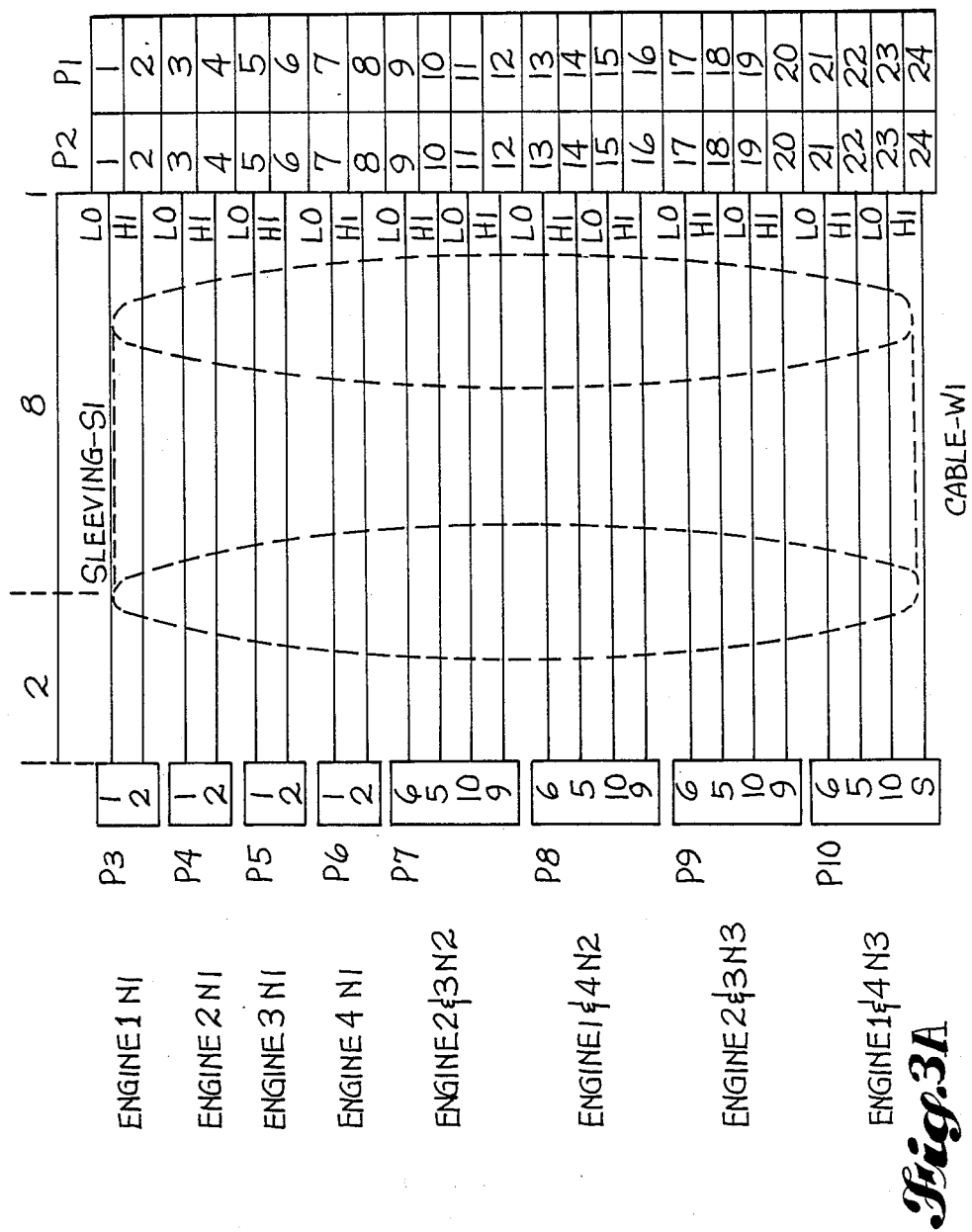
FIG. 3A shows the cable interfacing the flight deck of the aircraft to the engine tachometer unit.
Figure 3B:
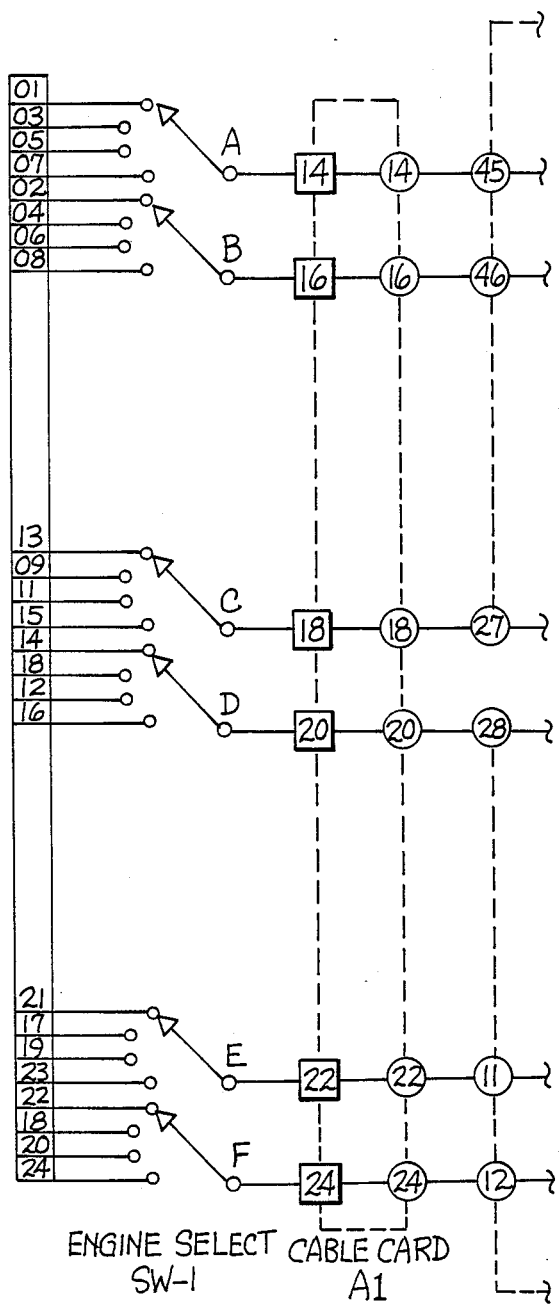
FIG. 3B is the engine select switch schematic for selecting engine 1, 2, 3 or 4 of the aircraft.
Figure 3C:
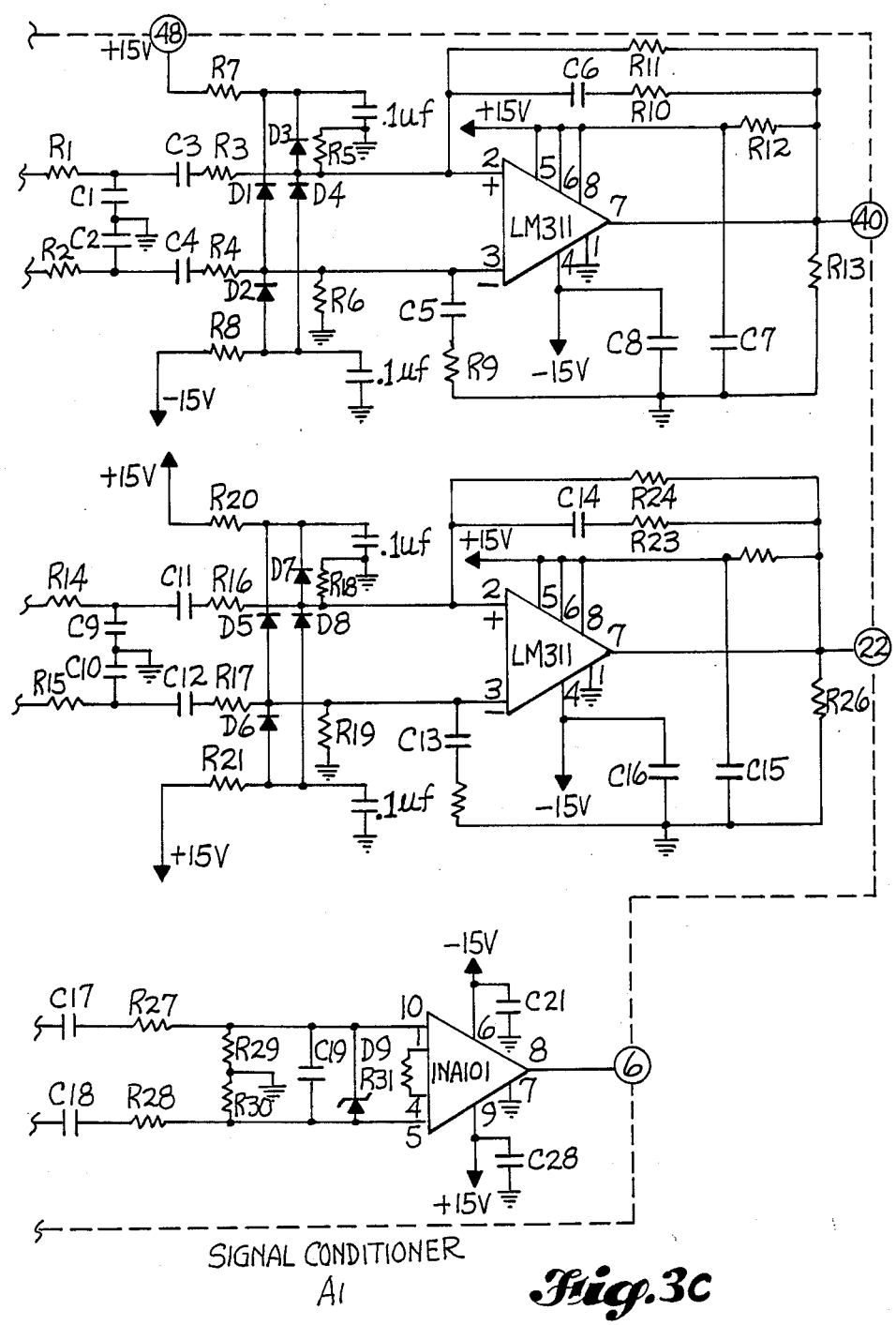
FIG. 3C is a schematic diagram of the signal conditioner.
Figure 3D:
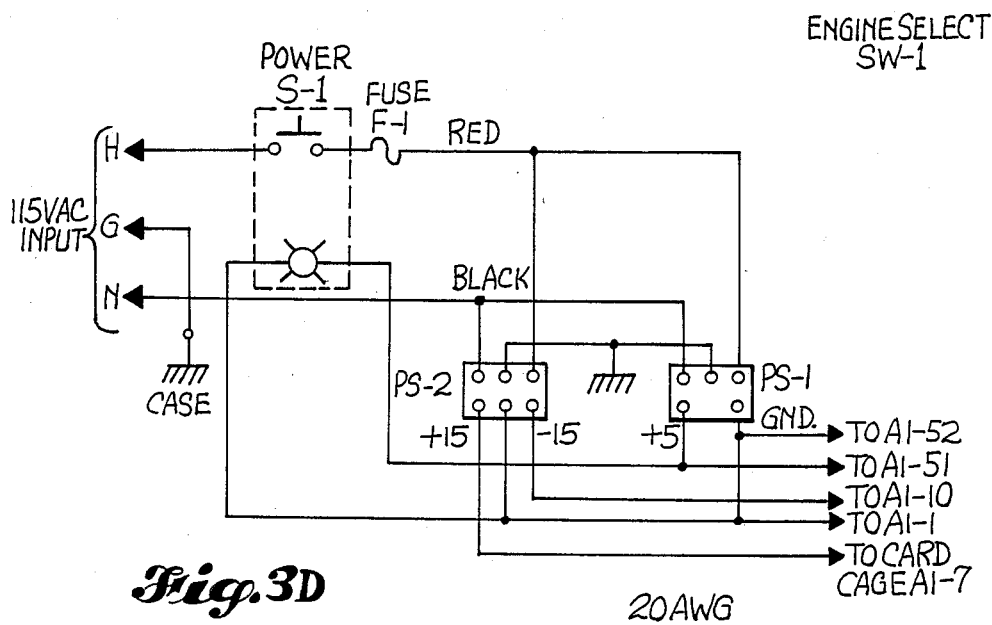
FIG. 3D is a schematic diagram of the input power and power distribution.
Figure 4A:
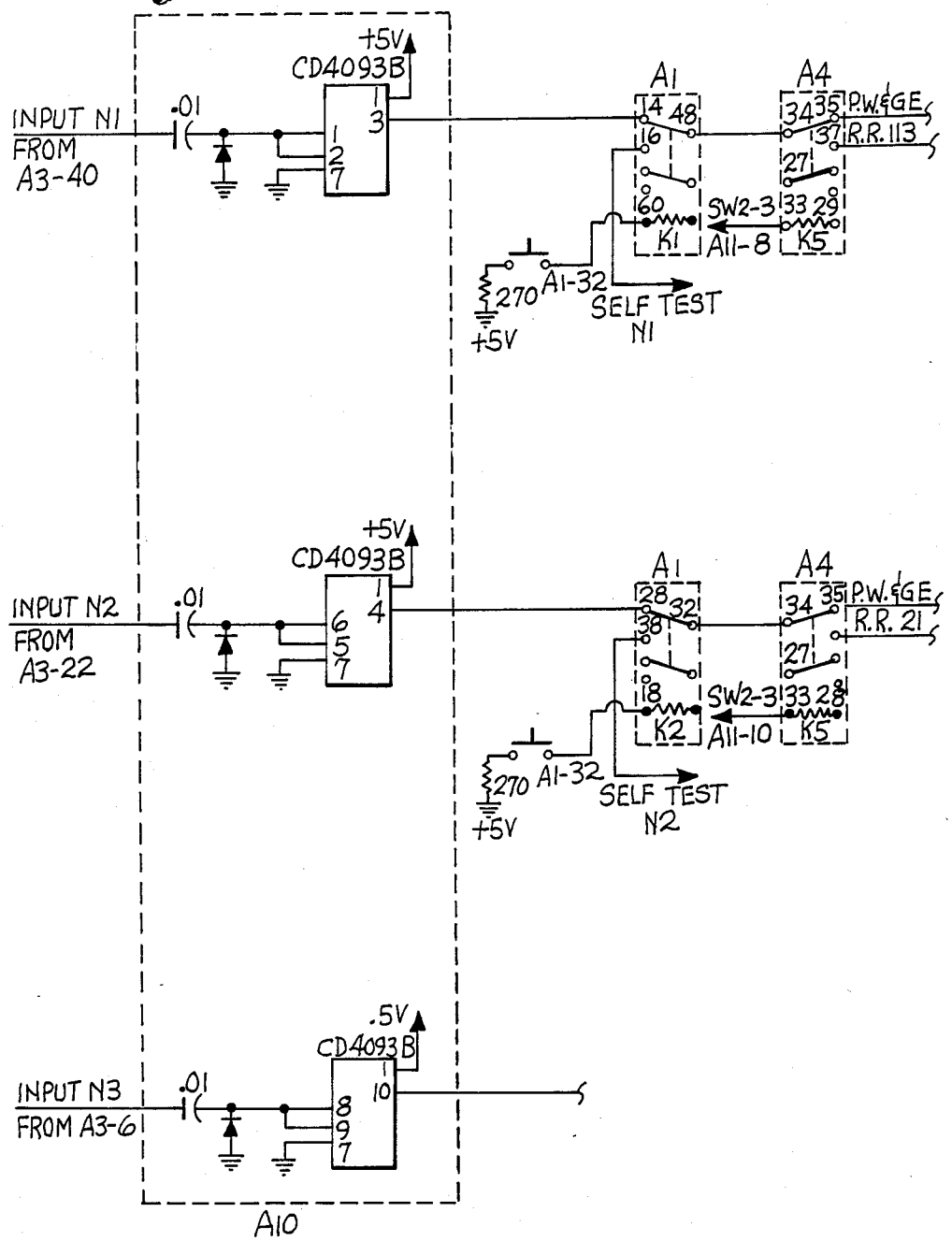
FIG. 4A is a schematic diagram showing squaring of the input signal for the dividers and multipliers and further shows relay logic for selecting engine type or self test.
Figure 4B:
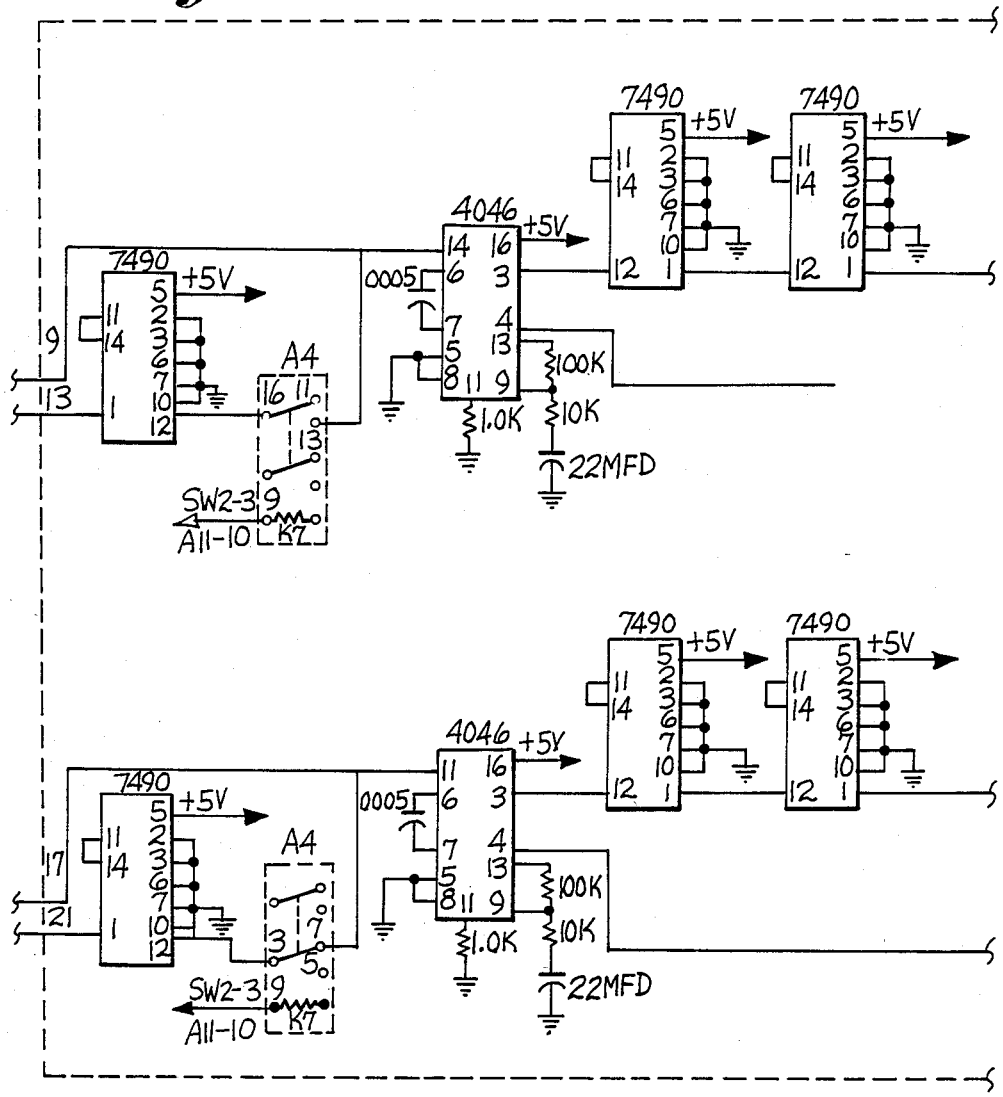
FIG. 4B shows schematically, dividers and multipliers for generating a signal for the N1, N2, and N3 meters.
Figure 4C:
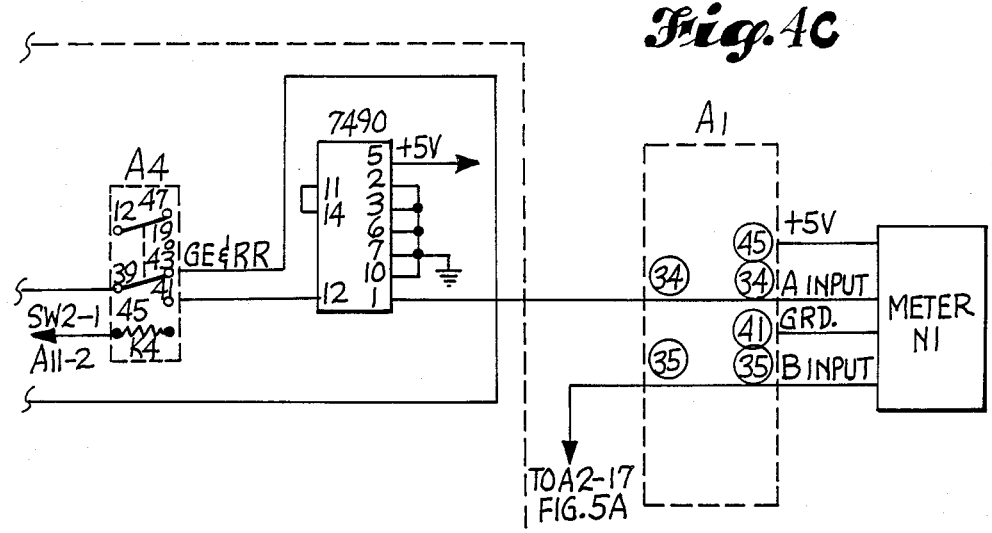
FIG. 4C shows the N1 and N2 meters.
Figure 4C:
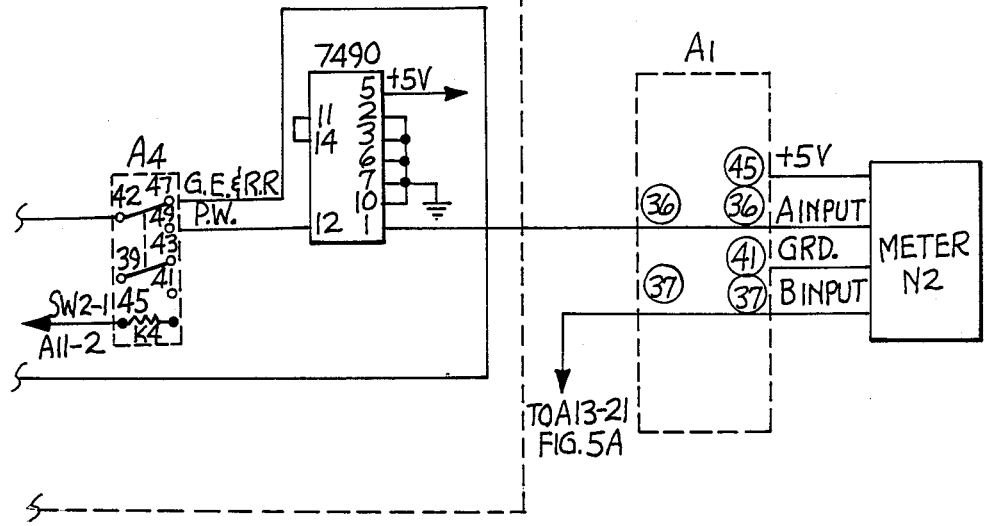
Figure 4D:
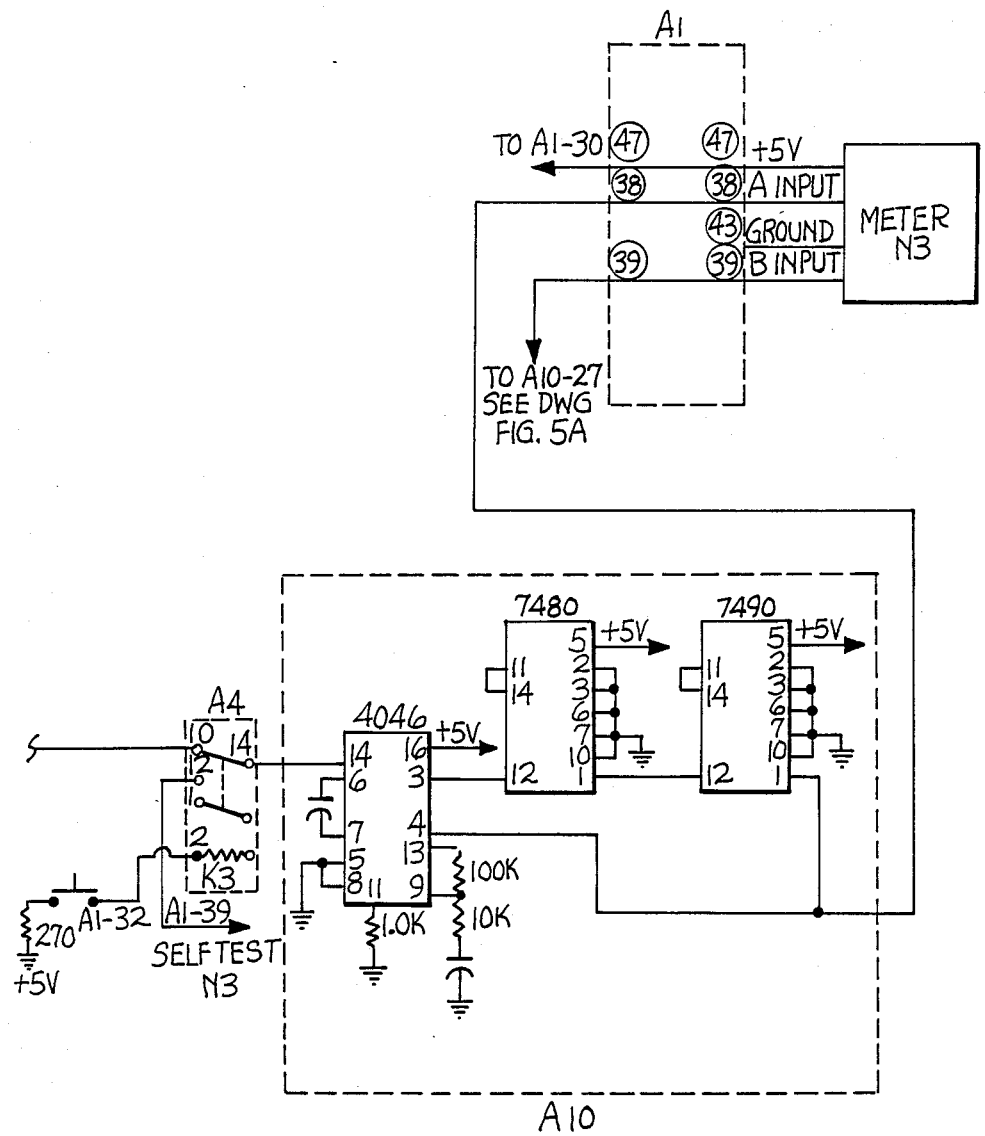
FIG. 4D shows the N3 meter and N3 logic for generating the F1 signal for the N3 meter.
Figure 5A:
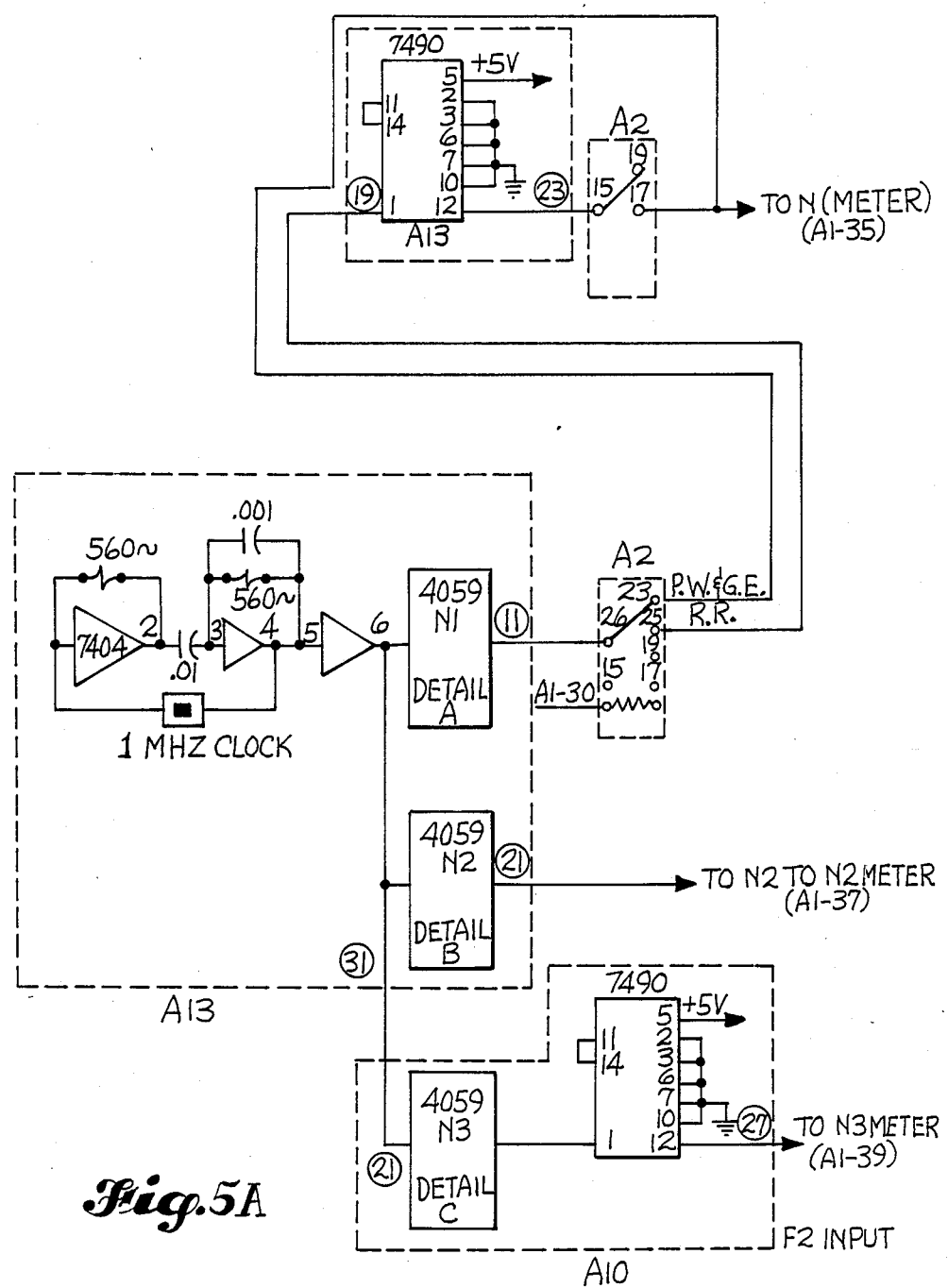
FIG. 5A is a schematic of clock and F2 input for the N1, N2, and N3 meters.
Figure 5B:
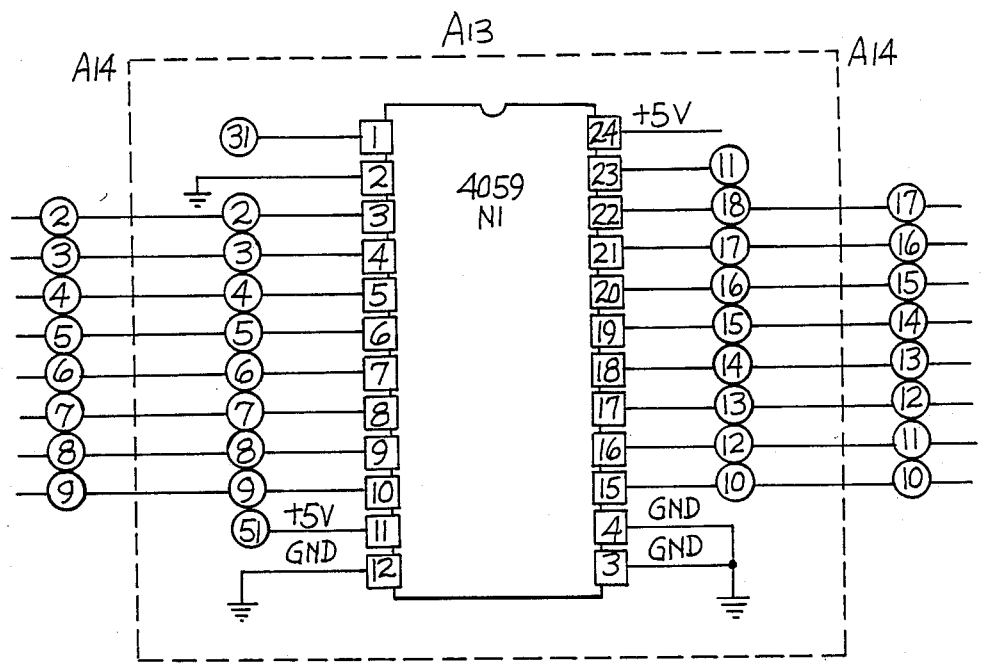
FIG. 5B shows the divider for the F2 input for the N1 meter.
Figure 5C:
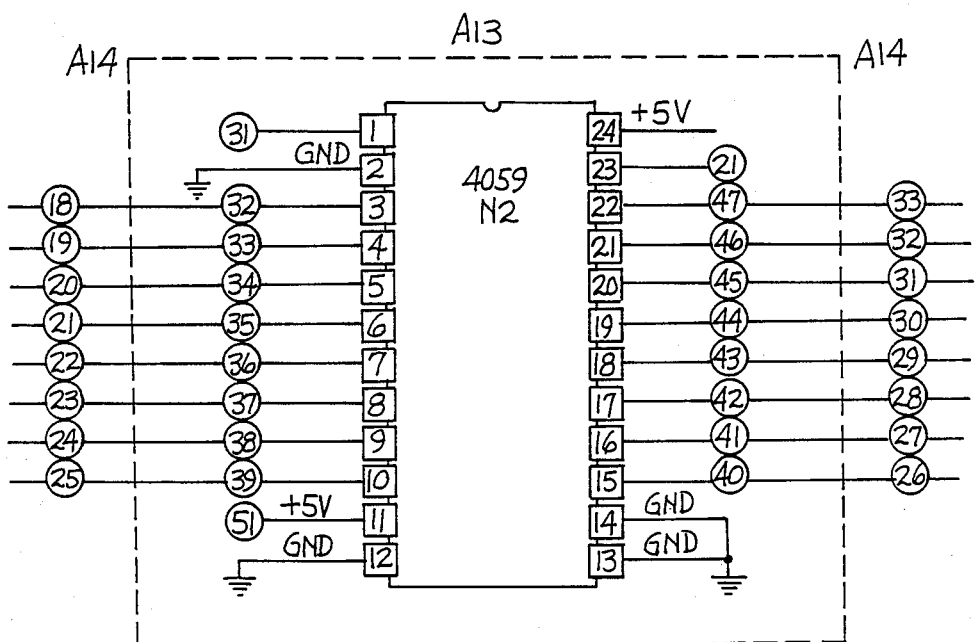
FIG. 5C shows the divider for F2 input for the N2 meter.
Figure 5D:
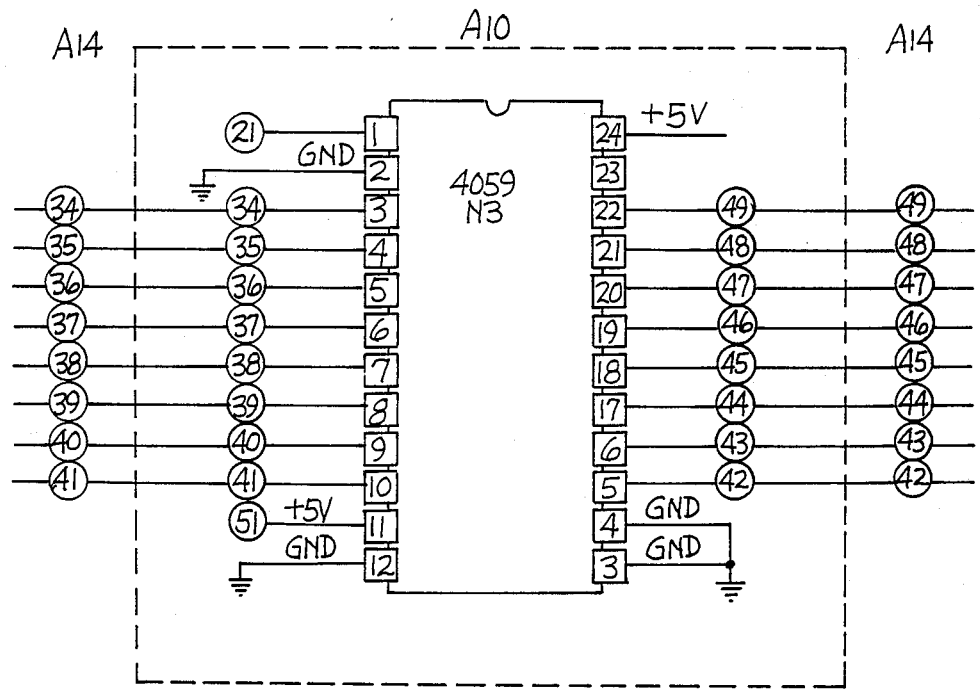

Turning now to FIG. 1 showing the functional block diagram, it can be seen that an input coupler 10 utilizes rotary switching means 12 to select the engine number that is going to be trimmed. A signal conditioning circuit means 20 includes a plurality of individual signal conditioning circuits for N1, N2, and N3 respectively, each of which conditioning circuits comprises an RC circuit for accepting inputs from the different types of engines to be tested. The range of input frequencies of the respective plurality of engines to be tested are from 10 Hz to 8400 Hz with amplitudes varying from 0.25 volts to 106 volts. Signal conditioning circuit means 20 is therefore able to handle a wide range of engine parameter input frequencies and provide clean signals for downstream utilization in the present engine trim tachometer unit of FIG. 1. Relay circuit means 30 is responsible for self test and selection of the particular aircraft engine type being utilized. The relays included in relay means 30 are activated by programmable DIP (dual-inline package) plugs 35 shown on the panel illustrated in FIG. 2. Relays 31, 32, and 33 when energized with 5 volts perform the self test function. The self test takes a known frequency provided by programmable divider means 80 and transmits the signal of known frequency through the F1 channel. This is done in order to test relays 34 and 35 and also to test the divider and multiplier circuits in divider and multiplier circuit means 50. Relays 34 and 35 are excited with 5 volt signals from jamming input circuit means 40. Some aircraft require the input frequency to be divided by a factor of 10 in order to get a 100% reading at display meters 61, 62, and 63.

Jamming input circuit means 40 provides for triggering of relay circuit means 30 and setting up programmable divider circuit means 80. Jamming input circuit means 40 is set up by the operator of the engine trim tachometer unit of FIG. 1. Before starting the engine trim process, the operator will install two programmable DIP plugs on the front panel shown in FIG. 2. Each engine type has its own set of DIP plugs. These DIP plugs are installed into a zero insertion force connector (not shown on the front panel shown in FIG. 2). The DIP plugs may be stored in the lid of the unit (not shown). When a new engine type trim tachometer unit calibration is required, the operator need only install a new set of DIP plugs. Multiplier circuit means 50 multiplies the input frequency by a factor of 10, 100, or 1000 by a phase lock loop depending on the type of engine being trimmed. Multifunction 8-digit counter means 60 for measuring frequency, frequency ratio, and period is coupled to N1, N2, and N3 meter means 61, 62, and 63. Three counters of multifunction 8-digit counter circuit means 60 are set up in the frequency ratio mode. The mode will take a frequency F1 and divide it by a known frequency F2. Frequency F1 is the frequency from the aircraft processed downstream through circuit subsystems 10, 20, 30, 40, and 50. Frequency F2 is generated in circuit subsystems 70 and 80. Multifunction 8-digit counter means 60 is updated every 0.1 seconds. Clock circuit means 70 comprises a 1 MHz clock which clock generates a 1 MHz frequency for programmable divider circuit means 80. Programmable circuit means 80 comprises a 24 pin divider which generates a known frequency for the F2 input of meters 61, 62, and 63.

FIGS. 3A, 3B, 3C, 3D, 4A, 4B, 4C, 4D, 5A, 5B, 5C, and 5D show a complete schematic diagram of the engine trim tachometer unit shown in FIG. 1. Actual circuit connections within the subsystems of FIG. 1 are detailed. In this connection for example it can be seen that programmable divider circuit means 80 comprises a 24 pin divider for generating a known frequency for the F2 input of the meters 61, 62, and 63. The input for programmable divider pin 1 is provided by the 1 MHz clock (shown as item 70 in FIG. 1). The output can be seen to be generated from pin 23. The remaining pins are set either high (5 volts) or low (ground) by jamming circuit input means 40 (shown in FIG. 1). Each engine type is jammed in a different way in order to generate the proper signal for the counter. As an example, one engine is 100% for N2 of 3900 Hz. The F1 signal shown in FIG. 1 going to the counter circuit means 60 after going through multiplier circuit in divider and multiplier circuit means 50 would be 39,000 Hz. The F2 signal would be set at 390 Hz. The ratio counter would display 100.0. The following is the Table of Components for the complete schematic diagram of FIGS. 3A, 3B, 3C, 3D, 4A, 4B, 4C, 4D, A, 5B, 5C, and 5D:

| Item | Value |
| --- | --- |
| S1 | Nylon sleeving |
| R31 | 270 |
| R29, R30 | 47K |
| R27, R28 | 2K |
| R26 | 2.2K (¼ W) |
| R25 | 1.0K (1 W) |
| R24 | 40 M |
| R22, R23 | 3.01 M |
| R20, R21 | 10 |
| R18, R19 | 10K |
| R16, R17 | 2.2K |
| R14, R15 | 33K |
| R13 | 2.2K (¼ W) |
| R12 | 1.0K (1 W) |
| R11 | 40 M |
| R9, R10 | 3.01 M |

-continued

| Item | Value |
| --- | --- |
| R7, R8 | 10 |
| R5, R6 | 10K |
| R3, R4 | 2.2K |
| R1, R2 | 33K |
| P7, P8, P9, P10 | MS24266R12B12P |
| P3, P4, P5, P6 | MS24266R10B5P |
| P2 | MS24266R16B24P |
| P1 | MS24264R16B24SN |
| D9 | ZENER DIODE (1N4625(B)) |
| D5, D6, D7, D8 | 1N5711 |
| D1, D2, D3, D4 | 1N5711 |
| C21 | .1 uf |
| C20 | .1 uf |
| C19 | .01 MFD |
| C17, C18 | 1 MFD |
| C16 | 0.1 uf |
| C15 | 1.0 uf |
| C13, C14 | 220 pf |
| C11, C12 | 1 MFD (400 V) |
| C9, C10 | 1 nf (1 KV) |
| C8 | 0.1 uf |
| C7 | 1.0 uf |
| C5, C6 | 220 pf |
| C3, C4 | 1 MFD (400 V) |
| C1, C2 | 1 nf (1 KV) |

What is claimed is:

1. An engine trim tachometer system comprising in combination:

a plurality of engine speed parameter measuring channels;

rotary switching means for selecting an engine to be trimmed;

signal conditioning means comprising a plurality of RC circuits coupled between said rotary switching means and said plurality of engine speed parameter measuring channels;

said signal conditioning means responsive to an engine speed parameter for generating a signal having frequencies from 10 Hz to 8400 Hz;

a clock circuit;

a plurality of measuring display devices responsive to the output of said plurality of engine speed measuring channels; and, programmable divider circuit means coupled between said clock and said plurality of display devices.

* * * * *